United States Patent Office 3,142,687
Patented July 28, 1964

1

3,142,687
STABILIZATION OF EPOXIDE COMPOSITIONS
William F. Goldsmith, South Charleston, and David F. Marples, St. Albans, W. Va., assignors to Union Carbide Corporation, a corporation of New York
No Drawing. Filed Jan. 8, 1962, Ser. No. 165,030
19 Claims. (Cl. 260—348)

This invention is directed to stabilization of epoxide compounds. More particularly, the invention is directed towards inhibiting the development of undesirable color in epoxide compounds. In one aspect, the invention is directed to color stabilized epoxide compositions having incorporated therein stabilizing quantities of certain peroxide compounds. In another aspect, this invention is directed to a process for achieving stabilization of epoxide compositions.

Epoxide compounds are currently used in a wide variety of applications. For example, polyepoxides find utility in laminations, adhesives, castings, moldings, and the like. Epoxides are also employed, in conjunction with other resinous materials, as modifiers. For example, epoxides are frequently used as plasticizers and stabilizers for polyvinyl chloride resins.

For a great many applications epoxide compounds which are essentially colorless are required. Frequently a color of less than 1 on the Gardner standard color scale (ASTM D 1544–58T) is considered an absolute necessity. Moreover, the epoxide composition must be able to retain its essentially colorless appearance during subsequent handling and storage.

Although it is known in the art that essentially colorless epoxide compounds can be prepared, these compounds exhibit a tendency towards the development of undesirable color. The color may develop during storage or in transit under the influence of relatively mild conditions. The rate at which color develops may be greatly increased during any processing subsequent to the production of the epoxide. For example, many applications require that the epoxide be in the form of a mobile liquid during formulation. However, heating of a normally viscous epoxide in order to reduce its viscosity is disadvantageous, in that the rate of color development is greatly increased. In another application, epoxide compositions are used as plasticizers for polyvinyl chloride resins. These resins are commonly milled at temperatures of about 350° F. Therefore, it is necessary that the plasticizers used in such resins possess a relatively high degree of stability at high temperatures. Furthermore, even though the temperature and exposure time are reduced to a practical minimum color develops during storage. Thus, the advantages gained by producing an essentially colorless epoxide are lost due to poor color stability.

The present invention is based on the discovery that an inhibiting amount of a peroxide compound incorporated into a vicinal epoxide compound, imparts to said epoxide compound a surprising and unexpected degree of color stability. Furthermore, it has been discovered that this resistance to discoloration is due, at least in part, to the presence of minimal concentration of the inhibitor. Generally epoxides are produced through the introduction of oxirane oxygen into olefinic double bonds by means of peracids, such as peracetic, perbenzoic acid, monoperphthalic acid, and the like. These epoxides generally contain a trace of residual peracid. A marked

2 contrast may therefore be observed between uninhibited epoxide compounds and identical compounds, which have been inhibited in accordance with the process of the present invention. The inhibited epoxides may be employed as intermediates in the production of resinous materials which similarly exhibit improved resistance to color development.

As stated previously, the present invention contemplates the use of an inhibiting amount of the inhibitor of choice to impart resistance to development of color. By the term "inhibiting amount," as used therein, is meant that quantity of inhibitor which, when added to the epoxide, is sufficient to effectively inhibit development of color, thus providing a means whereby the epoxide remains essentially colorless. Expressed differently, an inhibiting amount of the chosen inhibitor will effectively prevent increase of color with respect to the Gardner Standard Color Scale. The art is well apprised of the technique of inhibiting organic compounds in general, and the amount of inhibitor employed will be governed, to an extent, by the particular inhibitor employed, the particular epoxide to be stabilized, the subsequent applications of the epoxide, the degree of inhibition required, and other considerations.

Accordingly one or more of the following objects will be achieved by the practice of the present invention. It is an object of this invention to provide a novel composition comprising an epoxide compound and a peroxide compound. Another object is to provide a novel process for stabilizing epoxy compounds against the development of color, during storage and transit, by incorporating therein a peroxide compound. It is a further object of this invention to improve the heat stability of epoxide compositions by incorporating therein a peroxide compound.

In accordance with the present invention it has been found that satisfactory inhibition of color development in epoxide compounds can be achieved by incorporating therein an inhibiting amount of a peroxide compound. It should be noted that the present invention differs from the bleaching processes known to the art, in that it provides a means of preventing color development in an essentially colorless material. The present invention should not be confused with the bleaching processes, which do not prevent or inhibit future color development. This is clearly shown in Table II wherein it is demonstrated that an excess of hydrogen peroxide causes an increase in color. This is contrary to what would be expected if bleaching was the only operative mechanism.

Broadly the stabilizers or inhibitors of the present invention contain the unit —O—O— and preferably are composed solely of carbon, hydrogen and oxygen, said oxygen being in the form of peroxide oxygen. Illustrative peroxide compounds include, for instance, the dialkyl peroxides, e.g., dimethyl peroxide, diethyl peroxide, methyl ethyl peroxide, di-tertiary butyl peroxide, and the like; the dicycloalkyl peroxides, e.g., dicyclohexyl peroxide, dicyclopentyl peroxide, and the like; the hydrocarbon hydroperoxides, e.g., tertiary butyl hydroperoxide, cumene hydroperoxide, para-menthane hydroperoxide, methyl hydroperoxide, ethyl hydroperoxide, and the like; and hydrogen peroxide. It is pointed out that organic peracids, e.g., peracetic acid, perbenzoic acid, monoperphthalic acid, and the like are excluded from the term "peroxide compound."

The technique by which these inhibitors are incorporated or admixed with the epoxide is not critical. Any of a wide variety of means can be employed to effect intimate admixture of the epoxide with the inhibitor. The chosen inhibitor per se may be added directly or as a solution, either before or after the epoxide is refined; or it may be added to the final epoxide-containing formulation.

The temperature at which the inhibitor is introduced is not critical. In general the temperature may range from 20° C., and lower, to about 100° C., a preferred temperature being in the range of between about 70° C. to about 100° C. The inhibitor should not be added at a temperature which will cause thermal decomposition of the particular inhibitor. While the beneficial side effect of bleaching may be obtained when a peroxide is added at suitably elevated temperatures, it is again pointed out that this is not necessary to the present invention.

Contamination by metals may cause decomposition of the inhibitors with resultant loss of color inhibition. Therefore, it is important to avoid certain materials in construction of the reactor and storage vessels. Iron and copper containing alloys should be avoided. Pexoxides have been found to be stable in the presence of stainless steel and glass, and these are preferred as materials of construction for production and storage facilities.

The epoxides contemplated by the present invention contain at least one oxirane oxygen bonded to two vicinal carbon atoms. Stated differently the epoxide contains at least one vicinal epoxy group, i.e.

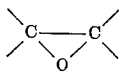

A single epoxide or a mixture of two or more may be inhibited as herein described.

Illustrative polyepoxides include, for example, the alkanediol bis(3,4-epoxycyclohexanecarboxylates), the alkenediol bis(3,4-epoxycyclohexanecarboxylates), the alkanediol bis(lower alkyl substituted - 3,4 - epoxycyclohexanecarboxylates), the oxaalkanediol bis(lower alkyl substituted - 3,4 - epoxycyclohexanecarboxylates), the alkanetriol tris(3,4-epoxycyclohexanecarboxylates), the alkenetriol tris(3,4-epoxycyclohexanecarboxylates), the alkanetriol tris(lower alkyl substituted-3,4-epoxycyclohexanecarboxylates), the oxaalkanetriol tris(3,4-epoxycyclohexanecarboxylates), the oxaalkanetriol tris(lower alkyl substtiuted-3,4-epoxycyclohexanecarboxylates), and the like. The above-illustrated polyol poly(3,4-epoxycyclohexanecarboxylates) can be prepared by epoxidizing the corresponding polyol poly(cyclohexenecarboxylate) with at least a stoichiometric quantity of peracetic acid per carbon to carbon double bond of said polyol poly(cyclohexenecarboxylate), at a temperature in the range of from about 25° C. to 90° C., for a period of time sufficient to introduce oxirane oxygen at the sites of all the carbon to carbon double bonds that are to be epoxidized. The peracetic acid is preferably contained in an inert solvent, e.g., ethers, ketones or liquid hydrocarbons and the like. The polyol poly(cyclohexenecarboxylates), in turn, can be prepared in accordance with well known, condensation techniques, e.g., the esterification of a polyol, e.g., ethylene glycol, diethylene glycol, triethylene glycol, tetraethylene glycol, 1,2-propylene glycol, 1,3-propylene glycol, the polyoxyethylene glycols, 1,4-butanediol, 1,5-pentanediol, 1,6-hexanediol, the octanediols, the octadecanediols, the butenediols, the pentenediols, the hexenediols, the octenediols, 1,2,3-propanetriol, trimethylolmethane, 1,1,1-trimethylolethane, 1,1,1-trimethylolpropane, 1,2,6-hexanetriol, cycloaliphatic triols, aromatic triols, and the like; with a 3-cyclohexenecarboxylic acid, e.g., 3-cyclohexenecarboxylic acid, lower alkyl substituted-3-cyclohexenecarboxylic acid, and the like. The expression "lower alkyl," as used in the disclosure, means an alkyl radical which contains from 1 to 4 carbon atoms.

Other polyepoxides contemplated include, for instance, the bis(3,4 - epoxycyclohexylmethyl) hydrocarbon dicarboxylates and the bis(lower alkyl substituted-3,4-epoxycyclohexylmethyl) hydrocarbon dicarboxylates, e.g., bis(3,4-epoxycyclohexylmethyl) oxalate,
bis(3,4-epoxycyclohexylmethyl) malonate,
bis(3,4-epoxycyclohexylmethyl) succinate,
bis(3,4-epoxycyclohexylmethyl) glutarate,
bis(3,4-epoxycyclohexylmethyl) adipate,
bis(3,4-epoxycyclohexylmethyl) maleate,
bis(3,4-epoxycyclohexylmethyl) tetrahydrophthalate,
bis(3,4-epoxycyclohexylmethyl) citraconate,
bis(3,4-epoxycyclohexylmethyl) isocitraconate,
bis(3,4-epoxy-6-methylcyclohexylmethyl) fumarate,
bis(3,4-epoxycyclohexylmethyl) pimelate,
bis(3,4-epoxycyclohexylmethyl) terephthalate,
bis(3,4-epoxycyclohexylmethyl) azelate,
bis(3,4-epoxycyclohexylmethyl) sebacate,
bis(3,4-epoxycyclohexylmethyl) itaconate,
bis(3,4-epoxycyclohexylmethyl) hexahydrophthalate,
bis(3,4-epoxycyclohexylmethyl) phthalate,
bis(3,4-epoxycyclohexylmethyl) glutaconate,
bis(3,4-epoxycyclohexylmethyl) hydromuconate, and the like.

Other desirable polyepoxides include the monoesters of 3,4-epoxycyclohexylmethanols, and 3,4-epoxycyclohexane-carboxylic acids such as, for example, 3,4-epoxycyclohexylmethyl 3,4-epoxycyclohexane-carboxylate,
1-methyl-3,4-epoxycyclohexylmethyl 1-methyl-3,4-epoxycyclohexanecarboxylate,
6-methyl-3,4-epoxycyclohexylmethyl 6-methyl-3,4-epoxycyclohexanecarboxylate,
2-ethyl-3,4-epoxycyclohexylmethyl 2-ethyl-3,4-epoxycyclohexanecarboxylate,
4-n-propyl-3,4-epoxycyclohexylmethyl 4-n-propyl-3,4-epoxycyclohexanecarboxylate,
5-isobutyl-3,4-epoxycyclohexanecarboxylate,
lower alkyl substituted-3,4-epoxycyclohexylmethyl lower alkyl substituted-3,4-epoxycyclohexanecarboxylate,
halo substituted-3,4-epoxycyclohexylmethyl halo substituted-3,4-epoxycyclohexanecarboxylate,
1-chloro-3,4-epoxycyclohexylmethyl 1-chloro-3,4-epoxycyclohexanecarboxylate,
2-bromo-3,4-epoxycyclohexylmethyl 2-bromo-3,4-epoxycyclohexanecarboxylate, and the like.

Still other desirable polyepoxides include, by way of illustration, the 3-oxatetracyclo[4.4.0.1$^{7,10}$.0$^{2,4}$]undec-8-yl vicinal-epoxyalkyl ethers, the 3-oxatetracyclo[4.4.0.1$^{7,10}$.0$^{2,4}$]undec-8-yl vicinal-epoxycycloalkyl ethers, the 3-oxatetracyclo[4.4.0.1$^{7,10}$.0$^{2,4}$]undec-8-yl vicinal - epoxycycloalkyl ethers, the 3 - oxatetracyclo[4.4.0.1$^{7,10}$.0$^{2,4}$]-undec-8-yl 3-oxatricyclo[3.2.1.0$^{2,4}$]oct-6-yl ethers, the 3-oxatetracyclo[4.4.0.1$^{7,10}$.0$^{2,4}$]undec-8-yl 3-oxatricyclo-[3.2.1.0$^{2,4}$]oct-6-ylalkyl ethers, and the like. Specific examples include 3-oxatetracyclo[4.4.0.1$^{7,10}$.0$^{2,4}$]undec-8-yl 2,3-epoxypropyl ether,
3-oxatetracyclo[4.4.0.1$^{7,10}$.0$^{2,4}$]undec-8-yl 3,4-epoxybutyl ether,
3-oxatetracyclo[4.4.0.1$^{7,10}$.0$^{2,4}$]undec-8-yl 2,3-epoxybutyl ether,
3-oxatetracyclo[4.4.0.1$^{7,10}$.0$^{2,4}$]undec-8-yl 3,4-epoxyhexyl ether,
3-oxatetracyclo[4.4.0.1$^{7,10}$.0$^{2,4}$]undec-8-yl 5,6-epoxyhexyl ether,
3-oxatetracyclo[4.4.0.1$^{7,10}$.0$^{2,4}$]undec-8-yl 7,8-epoxyoctyl ether,
3-oxatetracyclo[4.4.0.1$^{7,10}$.0$^{2,4}$]undec-8-yl 2-methyl-2,3-epoxypropyl ether,
3-oxatetracyclo[4.4.0.1$^{7,10}$.0$^{2,4}$]undec-8-yl 2-ethyl-2,3-epoxyhexyl ether, 3-oxatetracyclo[4.4.0.1⁷,¹⁰.0²,⁴]undec-8-yl 9,10-epoxy-stearyl ether,
3-oxatetracyclo[4.4.0.1⁷,¹⁰.0²,⁴]undec-8-yl 9,10,12,13-diepoxystearyl ether,
3-oxatetracyclo]4.4.0.1⁷,¹⁰.0²,⁴]undec-8-yl 2,3-epoxycyclopentyl ether,
3-oxatetracyclo[4.4.0.1⁷,¹⁰.0²,⁴]undec-8-yl 2,3-epoxycyclopentylmethyl ether,
3-oxatetracyclo[4.4.0.1⁷,¹⁰.0²,⁴]undec-8-yl alkyl substituted 3,4-epoxycyclohexyl ether,
3-oxatetracyclo[4.4.0.1⁷,¹⁰.0²,⁴]undec-8-yl 3,4-epoxycyclohexyl ether,
3-oxatetracyclo[4.4.0.1⁷,¹⁰.0²,⁴]undec-8-yl 2,3-epoxycyclohexyl ether,
3-oxatetracyclo[4.4.0.1⁷,¹⁰.0²,⁴]undec-8-yl 3,4-epoxycyclohexylmethyl ether,
3-oxatetracyclo[4.4.0.1⁷,¹⁰.0²,⁴]undec-8-yl 6-methyl-3,4-epoxycyclohexylmethyl ether,
3-oxatetracyclo[4.4.0.1⁷,¹⁰.0²,⁴]undec-8-yl 5-methyl-3,4-epoxycyclohexylmethyl ether,
3-oxatetracyclo[4.4.0.1⁷,¹⁰.0²,⁴]undec-8-yl alkyl substituted 3-oxatricyclo[3.2.1.0²,⁴]oct-6-yl ether,
3-oxatetracyclo[4.4.0.1⁷,¹⁰.0²,⁴]undec-8-yl 3-oxatricyclo[3.2.1.0²,⁴]oct-6-yl ether, and the like.

Other useful epoxides contemplated by the present invention are the bis(epoxycycloalkyl)ethers, preferably wherein the cycloalkyl moiety contains from 5 to 7 carbon atoms, e.g., bis(2,3-cyclopentyl)ether, bis(2,3-epoxycyclohexyl)ether,

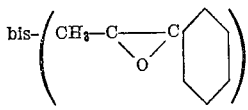

and the like. The cycloalkyl moiety of the above described ethers may be substituted with alkyl radicals containing up to four carbons, e.g., bis(methyl-2,3-epoxycyclopentyl)ether and the like. In addition, the invention contemplates the use of monoepoxides of the bis-(cycloalkenyl)ethers, bis(alkylcycloalkenyl)ethers, wherein the alkenyl moiety contains from five to seven carbon atoms and the alkyl contains up to four carbon atoms. Illustrative of such ethers are: cyclopentenyl 2,3-epoxycyclohexyl ether, methylcyclopentenyl 2,3-epoxycyclopentyl ether, cyclohexenyl methyl-2,3-epoxycyclopentyl ether and the like.

Other useful epoxides contemplated by the present invention are those obtained by epoxidation of polyolefinic marine and vegetable oils. In particular, the natural oils which are obtained from the seeds and nuts of certain plants and trees and from a few species of fish when epoxidized are well suited for use in the instant invention. These oils may be further defined as drying or semi-drying oils and are composed largely of triglycerides of the long chain unsaturated fatty acids containing from 18 to 22 carbon atoms and from 1 to 3 double bonds per chain. Oleic, linoleic and linolenic acid, which are found in the linseed type oils are typical of fatty acids having one, two and three double bonds, respectively. Typical drying oils which can be conveniently epoxidized include, among others, corn oil, linseed oil, soybean oil, tung oil, tall oil, safflower oil, herring oil, poppyseed oil, sunflower seed oil, sardine oil, menhaden oil and the like.

In addition to the naturally occurring glyceryl esters of the above described oils the present invention contemplates alkyl esters of the fatty acid epoxides. The alcohol used in the esterification may contain from 2 to 20 carbon atoms and from one to six hydroxyl groups. Illustrative compounds include the epoxides of ethylhexyl tallate, amyl tallate, pentoerythritol tetratallate and the like.

Additional useful epoxides contemplated by the invention are epoxidized alkyl esters of tetrahydrophthalic acid or anhydride, wherein the alkyl group may contain up to fifteen carbon atoms. Illustrative of such epoxides are: dimethl 3,4-epoxycyclohexane-1,6-dicarboxylate, didecyl 3,4-epoxycyclohexane-1,6-dicarboxylate, di(isodecyl) 3,4-epoxycyclohexane-1,6-dicarboxylate and the like.

Further epoxide contemplated by the invention are 4-vinylcyclohexene dioxide and dicyclopentadiene dioxide.

In a preferred aspect the invention is directed to monoepoxides and polyepoxides, particularly diepoxides. In a more preferred aspect the invention contemplates epoxides which contain carbon, hydrogen and oxygen. The oxygen atoms can be etheric oxygen, oxygen present in an ester group, i.e.,

oxygen present in carbonyl group, i.e.,

as well as oxirane oxygen. Another preferred class of epoxides are diepoxides containing at least one oxirane oxygen, bonded to vicinal cycloaliphatic carbon atoms. The cycloaliphatic nucleus preferably contains from 5 to 7 carbon atoms, including the epoxy carbon atoms. Illustrative epoxides include 4-vinylcyclohexene dioxide and dicyclopentadiene dioxide and the like.

As was previously indicated the invention contemplates an inhibiting amount of peroxide compound. Investigation has shown that color stabilization depends, at least in part, on a residual concentration of peroxide inhibitor. In general this residual concentration should be about 0.05 percent by weight, and calculated as $H_2O_2$, based on the weight of epoxide to be stabilized. A preferred concentration range is from about 0.01 to about 3.0 weight percent. In referring to residual amounts of peroxide it is found to be convenient to state the concentrations in terms of $H_2O_2$. Alternatively, one may consider a stabilizing amount, in terms of the amount of stabilizer, to be admixed with the epoxide in order to achieve the desired degree of stabilization. The following embodiments are considered to be illustrative of this concept. In a preferred embodiment of the invention, epoxides are inhibited by incorporating therein from about 0.05 to about 3.0 weight percent of 30 percent aqueous hydrogen peroxide, based on the weight of epoxide to be inhibited. In another preferred embodiment from about 0.1 to about 1.0 weight percent of cumene hydroperoxide may be incorporated in the epoxide to be inhibited. In a third preferred embodiment from about 0.05 to about 0.75 weight percent of di-tertiary butyl peroxide may be admixed with the epoxide to be stabilized.

The following examples will serve to illustrate the principle and the practice of the present invention. A standard heat stability test, well known in the art, was employed in the evaluation of the invention. This test consists of heating a sample epoxide for 2 hours at 350° F., in a constant temperature bath. The color of the epoxides is then compared, by appropriate means, with the original color of the epoxide. This provides a measure of the increase in color due to exposure to elevated temperatures. The samples of inhibited epoxides were tested by the same procedure. The color comparisons were made with reference to the Gardner Standard color scale (ASTM 1544–58T).

EXAMPLES 1–6

To one thousand grams of an epoxy compound there was added 5 grams of 30 percent aqueous hydrogen peroxide. The mixture was stirred continuously and heated to 95° C.–97° C. and this temperature maintained for three hours. The water contained in the hydrogen peroxide was removed by evaporation at a pressure of 1 mm. Hg absolute, and a temperature of 70° C–80° C., over a period of 2 hours.

The heat stability of each epoxy compound so treated, was tested by immersing a sample in an oil bath for 2 hours at 350° F. After the heat treatment the color was determined, relative to the Gardner standard scale. The results obtained, with four different epoxies are shown in Table I below.

*Table I*

| Example No. | Epoxy Compound | Color after 2 hrs. at 350° C. | |
|---|---|---|---|
| | | Unstabilized | Stabilized |
| 1 | Soybean Oil Epoxide | 6 | 2 |
| 2 | 2-Ethylhexyl Epoxytallate | 5.5 | 1 |
| 3 | Diisodecyl 4,5-Epoxytetrahydrophthalate | 2 | |
| 4 | 3,4-Epoxy-6-methylcyclohexylmethyl-3,4-Epoxy-6-methylcyclohexanecarboxylate | a 11.5 | b 5.5 |
| 5 | Di(isodecyl)-3,4-epoxytetrahydro- | 2 | 1 |
| 6 | do | 5 | 1 | a One hour at 350° F.
b 5 weight percent of 30 percent aqueous hydrogen peroxide.

EXAMPLE 7

Thirty grams of 3,4-epoxy-6-methylcyclohexylmethyl 3,4-epoxy-6-methylcyclohexanecarboxylate was charged to a dry pressure bottle. The initial color of the epoxide was 3.5 Gardner. Various amounts of 30 percent aqueous hydrogen peroxide were added and the mixture agitated for about 10 seconds. The bottle was capped and placed in a water bath at a temperature of 98° C.±2° C. After 16 hours, the bottle was removed and cooled, and the color of the epoxide determined. Table II demonstrates the effect of the peroxide on the color stability.

*Table II*

| Weight percent of 30% $H_2O_2$ added | Color after 16 hours at 98° ± 2° C. |
|---|---|
| 0 [1] | 5.7 |
| 0.1 | 1.2 |
| 0.3 | 1.2 |
| 1.0 | 1.2 |
| 3.0 | 3.0 |
| 10.0 | 7.0 |

[1] Control, no peroxide added.

EXAMPLE 8

Thirty grams of 3,4-epoxy-6-methylcyclohexylmethyl 3,4-epoxy-6-methylcyclohexanecarboxylate was charged to a dry pressure bottle, and stabilized with 1.0 weight percent cumene hydroperoxide. The initial color of the epoxide was 3.5 Gardner. The bottle was capped and placed in a water bath at 98°±2° C. for a period of 16 hours. The color of the stabilized epoxide was 3.4 Gardner, at the end of the 16 hour period. An unstabilized control sample of the same epoxide material was 5.7 Gardner, at the completion of the test.

EXAMPLE 9

2-ethylhexyl epoxytallate was stabilized with 1.0 weight percent of a 30 percent aqueous solution of hydrogen peroxide. The resulting admixture was then maintained at a temperature of 70° C. for a period of 2 hours, after which a sample was drawn off. Part of this sample was analyzed for residual $H_2O_2$ and the remainder was subjected to the standard color stability test conducted at 350° F. for 2 hours. Thereafter, the color of the sample was determined as was also the residual $H_2O_2$. The bulk of the original admixture was then subjected to successive evaporations at 70° C.-80° C. for 2 hour periods. After each evaporation a sample was drawn off, part of which was analyzed immediately for residual $H_2O_2$ and the remainder subjected to the standard color stability test.

The data is summarized in the following table which indicates the effect of residual $H_2O_2$.

*Table III*

| Number of evaporations | $H_2O_2$ residue after evaporation [1] | Color after 2 hrs. at 350° F.[2] | Percent $H_2O_2$ after 2 hrs. at 350° F. |
|---|---|---|---|
| None | 0.055 | 1 | 0.0034 |
| 1 | 0.020 | 0.4 | 0.0016 |
| 2 | 0.0037 | 2.2 | 0.0016 |
| 3 | 0.0028 | 2.8 | 0.0019 |
| 4 | 0.0021 | 3.3 | Nil |
| 5 | 0.0025 | 3.8 | Nil |
| Control [3] | 0.002 | 5.5 | |

[1] Weight percent residual $H_2O_2$, based on the weight of epoxide.
[2] Gardner Color Scale.
[3] No $H_2O_2$ added as stabilizer. Residual $H_2O_2$ of 0.002 percent remaining from epoxidation.

EXAMPLE 10

Experiments were made to determine the effect of various metals on the stabilization of 2-ethylhexyl epoxytallate with hydrogen peroxide. A mixture of 100 ml. of epoxide and 2 ml. of 30 percent hydrogen peroxide was charge to a pressure bottle containing a metal test specimen. The mixture was heated for 2 hours at 100° C. after which the water was removed by evaporation at reduced pressure. The exposide was then subjected to the heat stability test of 2 hours at 350° F.

*Table IV*

| Metal Test Specimen | Color After 2 hours at 350° F. |
|---|---|
| Blank (no metal) | 2 |
| Stainless Steel | 1.5 |
| Mild Steel (low carbon) | 5.7 |
| Everdur (a copper base alloy) | 5.1 |

EXAMPLE 11

A sample of 2-ethylhexyl epoxytallate was stabilized with 0.25 weight percent of cumene hydroperoxide, based on the weight of epoxide. The mixture was maintained at a temperature of about 74° F. and stirred continuously for a period of three hours. The sample was then immersed in an oil bath for 2 hours at a temperature of 350° F. After this heat treatment the color was determined relative to the Gardner scale and found to be less than 1. An untabilized sample of the same material, having been subjected to the same procedure had a color of 5.5.

EXAMPLE 12

Samples of 2-ethylhexyl epoxytallate were stabilized by the addition at room temperature, i.e., 74° F., of various amounts of ditertiary butyl peroxide. The pressure bottle containing the stabilized epoxy compound was placed in a water bath for 16 hours at 98±2° C. When the contents reached room temperature a sample of each was subjected to 350° F. for 2 hours and the color determined on the Gardner scale.

*Table V*

| Weight Percent of Peroxide Added | Color After Stability Test |
|---|---|
| 0 | 5.5 |
| 0.1 | <1 |
| 0.25 | <1 |

What is claimed is:
1. A color stabilized composition comprising an epoxy compound having at least one vicinal epoxy group and an amount of a peroxide compound at least sufficient to inhibit color development, said peroxide compound being selected from the group consisting of dialkyl peroxides, dicycloalkyl peroxides, hydrocarbon hydroperoxides, and hydrogen peroxide.

2. A color stabilized composition comprising a vicinal diepoxide and from about 0.01 to about 3.0 weight percent of hydrogen peroxide, based on the weight of diepoxide.

3. A color stabilized composition comprising a vicinal diepoxide compound and an amount of hydrocarbon peroxide compound at least sufficient to inhibit color development.

4. A color stabilized composition comprising a vicinal diepoxide compound and from about 0.1 to about 1.0 weight percent of cumene hydroperoxide based on the weight of diepoxide.

5. A color stabilized composition comprising a vicinal diepoxide compound and from about 0.05 to about 0.75 weight percent of di-tertiary butyl peroxide based on the weight of diepoxide.

6. A color stabilized composition comprising a vicinal monoepoxide compound and from about 0.01 to about 3.0 weight percent of hydrogen peroxide based on the weight of monoepoxide.

7. A color stabilized composition comprising a vicinal monoepoxide compound and an amount of hydrocarbon peroxide compound at least sufficient to inhibit color development.

8. A color stabilized composition comprising a vicinal monoepoxide compound and from about 0.1 to about 1.0 weight percent of cumene hydroperoxide based on the weight of monoepoxide.

9. A color stabilized composition comprising a vicinal monoepoxide compound and from about 0.05 to about 0.75 weight percent of di-tertiary butyl peroxide based on the weight of monoepoxide.

10. A color stabilized composition comprising a vicinal diepoxide of bis(cyclopentyl) ether and a color stabilizing amount of hydrogen peroxide.

11. A color stabilized composition comprising a vicinal epoxide of a naturally occurring glyceryl ester and a color stabilizing amount of hydrogen peroxide.

12. A color stabilized composition comprising a vicinal epoxidized ester of tetrahydrophthalic acid and a color stabilizing amount of hydrogen peroxide.

13. A color stabilized composition comprising (a) a hydrocarbon dicarboxylic acid diester of a 3,4-epoxycyclohexylmethanol, and (b) a color stabilizing amount of hydrogen peroxide.

14. A color stabilized composition comprising (a) a dihydric alcohol diester of 3,4-epoxycyclohexane carboxylic acid, and (b) a color stabilizing amount of hydrogen peroxide.

15. A color stabilized composition comprising a 3,4-epoxycyclohexylmethyl - 3,4-epoxycyclohexanecarboxylate and a stabilizing amount of hydrogen peroxide.

16. A process for stabilizing vicinal epoxy compounds against color development which comprises addition of a stabilizing quantity of a peroxide compound selected from the group consisting of dialkyl peroxides, dicycloalkyl peroxides, hydrocarbon hydroperoxides and hydrogen peroxide said stabilizing quantity being sufficient to provide a residual concentration of about 0.01 to about 3.0 weight percent, calculated as hydrogen peroxide.

17. A process for stabilizing vicinal epoxy compounds against development of undesirable color which comprises the addition of from about 0.05 to about 3.0 weight percent of 30 percent aqueous hydrogen peroxide, based upon the weight of epoxide to be stabilized.

18. A process for stabilizing vicinal epoxy compounds against development of undesirable color which comprises the addition of from about 0.05 to about 0.75 weight percent of di-tertiary butyl peroxide, based upon the weight of epoxide to be stabilized.

19. A process for stabilizing vicinal epoxy compounds against the development of undesirable color which comprises the addition of from about 0.1 to about 1.0 weight percent of cumene hydroperoxide, based upon the weight of peroxide to be stabilized.

References Cited in the file of this patent

UNITED STATES PATENTS

| | | |
|---|---|---|
| 2,767,204 | Thompson | Oct. 16, 1956 |
| 2,984,648 | Williams et al. | May 16, 1961 |
| 3,040,076 | Seidel et al. | June 19, 1962 |

FOREIGN PATENTS

| | | |
|---|---|---|
| 1,158,642 | France | June 17, 1958 |